Jan. 12, 1937. C. H. BARTON 2,067,592
TRANSMISSION
Filed Feb. 13, 1931 3 Sheets-Sheet 2
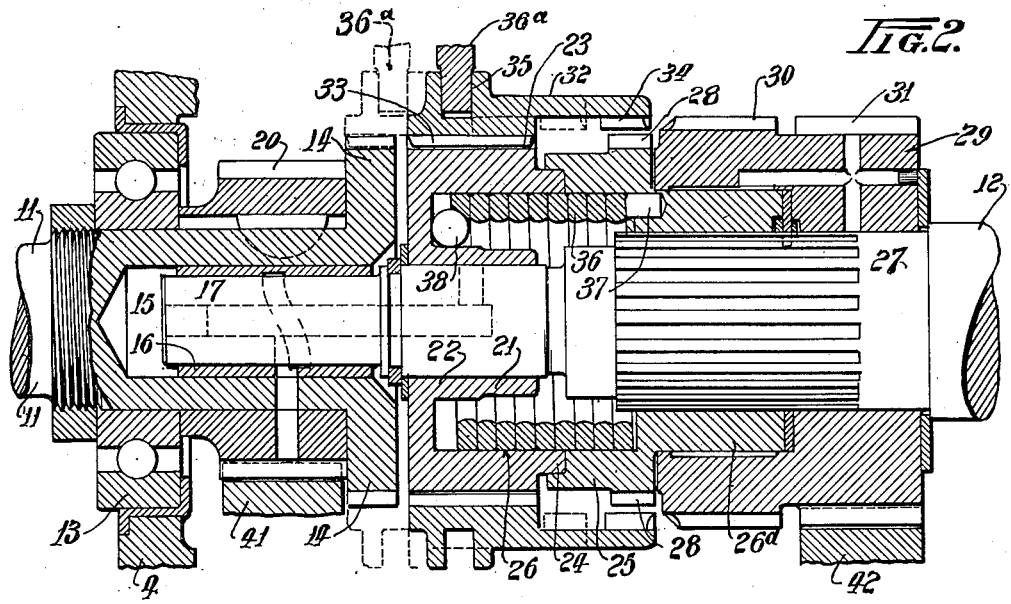
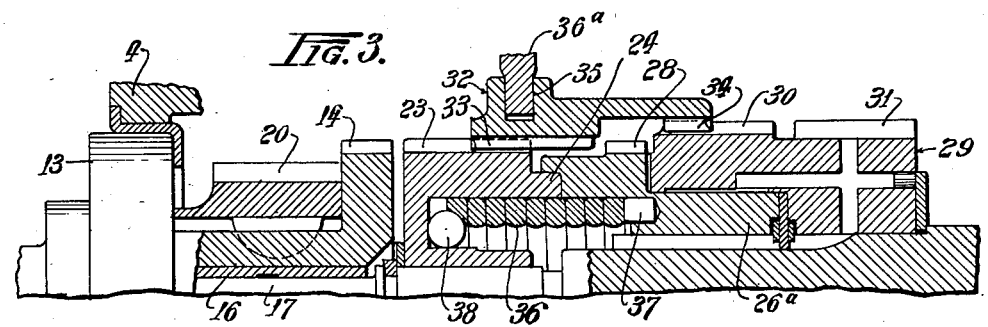
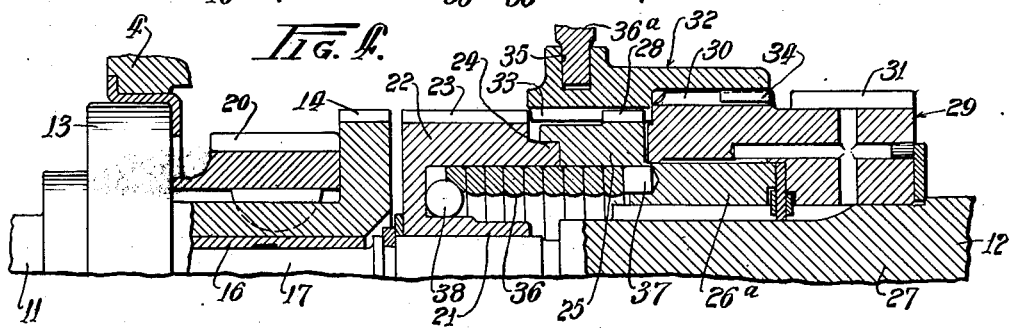
Inventor:
Clarence H. Barton,
By: Arthur W. Nelson
Atty.

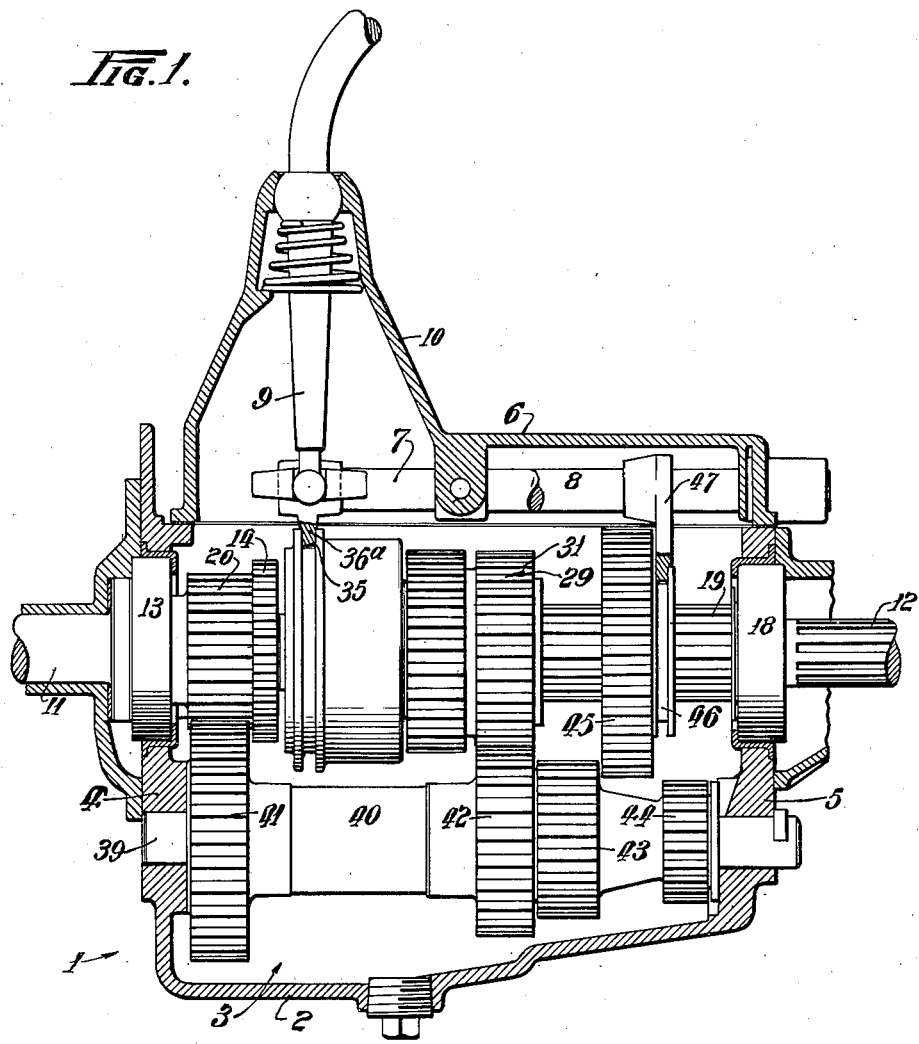

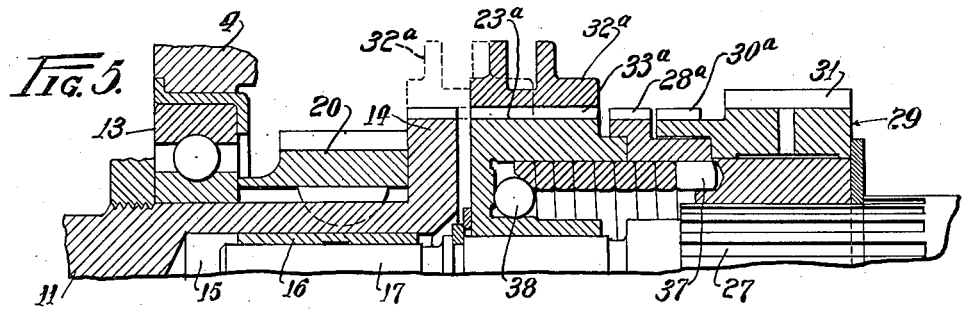
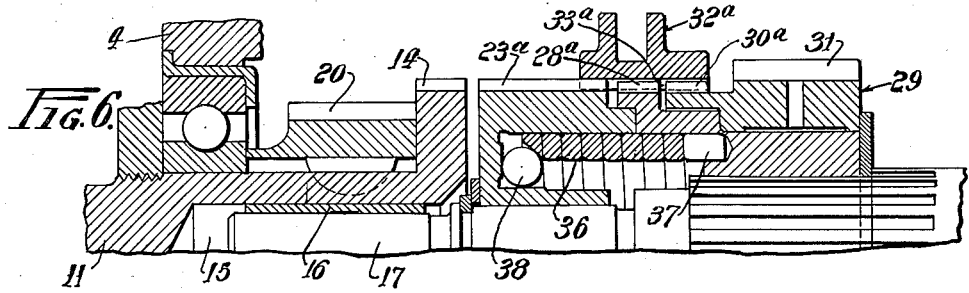
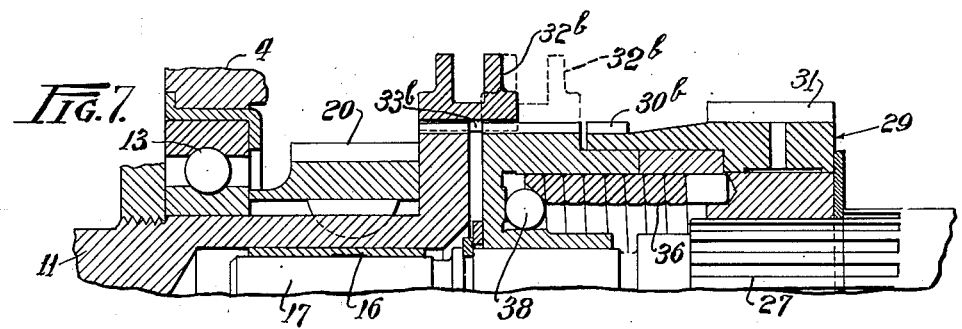
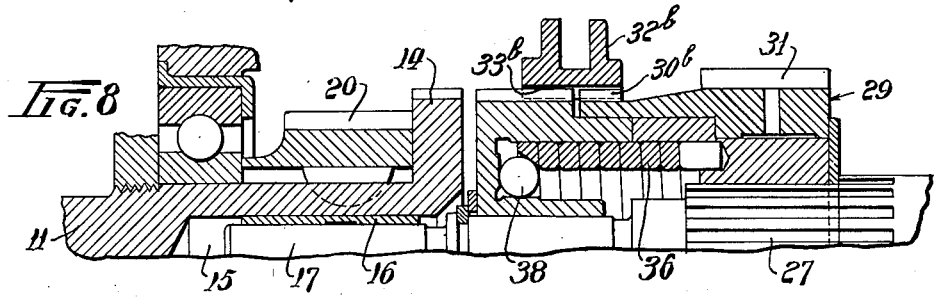

Patented Jan. 12, 1937

2,067,592

UNITED STATES PATENT OFFICE 2,067,592

TRANSMISSION

Clarence H. Barton, Indianapolis, Ind., assignor, by mesne assignments, to William C. Starkey, Raymond S. Pruitt, and Walter H. Beal, trustees Application February 13, 1931, Serial No. 515,434

2 Claims. (Cl. 74—370)

This invention relates to improvements in transmissions for automobiles and the like and it consists of the matters hereinafter described and more particularly pointed out in the appended claims.

The primary object of the invention is to provide a transmission of this kind which has a free wheeling unit incorporated therein, and which unit is capable of being locked out of operation when the gearing of the transmission has been actuated to produce either high or second speed gear ratios between the driving and driven shafts of the transmission.

Another object of the invention is to provide a transmission of this kind wherein the free wheeling unit is immovable longitudinally of the shaft upon which it is disposed and includes a longitudinally shiftable collar which according to the shift imparted thereto is capable of bringing in or locking out the free wheeling action, in distinction from those transmissions wherein the unit itself is shifted to lock the same in or out.

These objects of the invention as well as others, together with the many advantages thereof, will more fully appear as I proceed with my invention.

In the drawings:—

Fig. 1 is a longitudinal vertical sectional view through a conventional type of change speed transmission, equipped with means embodying my invention to provide free wheeling in high and second speed gear and a locking out of such free wheeling in second gear, the gearing and associated parts of the transmission being shown in side elevation.

Fig. 2 is a longitudinal vertical sectional view on an enlarged scale through that part of the transmission including my improved unit and with the parts in neutral, wherein there is no driving connection between the driving and driven shafts.

Fig. 3 is a detail fragmentary view of parts shown in Fig. 2 in that position producing second speed with free wheeling.

Fig. 4 is a view similar to Fig. 3 with the parts in a position producing second speed without free wheeling.

Fig. 5 is a fragmentary view similar to Fig. 3 and illustrates a construction capable of producing free wheeling in high only and with the parts shown in neutral with no driving connection between the driving and driven shafts.

Fig. 6 is a view of the parts shown in Fig. 5 in a changed relation to produce second speed without free wheeling.

Fig. 7 is another view similar to Fig. 3 of a modified construction producing free wheeling in both high and second speed gear and with the parts in a position to produce a free wheeling drive in said high speed gear.

Fig. 8 shows the parts of Fig. 7 in the position providing second speed gear with free wheeling and with no means provided to lock out free wheeling when in this position.

Referring now in detail to that embodiment of the invention, illustrated in the accompanying drawings:—I indicates the casing of the transmission. This casing includes a bottom wall 2, side walls 3, a front end wall 4 and a rear end wall 5. Associated with the casing and closing the open top thereof, is a cover 6 which is secured to the casing in any suitable manner. In the cover are the shift rods or rails 7 and 8, which are both formed at their front ends to be operatively engaged by the bottom end of a shift lever 9 having a ball and socket or universal joint engagement in a hollow cone like housing 10 rising from one end of the cover 6.

The shift rod 7 is adapted to control second and high speed operation of the transmission while the rod 8 is adapted to control low speed and reverse operation of the transmission.

11 indicates the drive shaft of the transmission. This shaft is adapted to be connected with the engine (not shown) in any suitable manner. 12 indicates the coaxially disposed driven shaft of the transmission and this shaft is adapted to be connected up with the propeller shaft of the automobile with which the transmission is associated.

The drive shaft 11 is journalled in anti-friction bearings 13 in the front wall 4 of the casing and has a gear like clutch member 14 at its rear end. In the rear end of said shaft is an axial recess 15 to receive a bearing 16 for the reduced front end portion 17 of the driven shaft 12. This shaft 12 is journalled near its rear end in an anti-friction bearing 18 in the rear wall 5 of the casing and is longitudinally splined as at 19 for a suitable distance forward of said bearing for a purpose soon to appear. On the drive shaft 11 between the bearing 13 and the clutch member 14 is a spur gear 20 of a diameter smaller than that of said member 14.

Rotatably mounted on a part 21 of the driven shaft 12, adjacent the clutch member 14 is the hub of a cup shaped clutch member 22 having full length splines or teeth 23 on its outer periphery. This cup member is open at its rear end and has an annular flange 24 of reduced diameter that is overhung by the front end portion of a second or complemental cup shaped clutch member 25. The clutch member 25 coacts with the cup shaped member 22 to provide a clutch spring recess 26 and includes a hub 26ª that is splined to a third part 27 of the driven shaft 12. On the rear end of the cup member 25 are splines or teeth 28 that are only about one-half the length of said cup member.

Rotatively mounted on the shaft part 27 but secured against endwise movement thereon is a gear-like member 29 having its front end portion overhanging the hub 26ª of the clutch member 25. Said member 29 is provided with front and rear sets of splines or teeth 30 and 31 respectively.

Associated with the clutch members 22 and 25 and the front end of the gear-like member 29 is a collar 32, having internal splines or teeth 33 at the front end adapted for engagement with the clutch teeth or splines of the member 14 as well as with the teeth 23 and 28 of said clutch members. On the rear end of this collar are internal splines or teeth 34 adapted for engagement with the splines 30 of the gear-like member 29. This collar is provided near its front end with an annular groove 35 to receive a yoke 36ª which is fixed to and movable with the shift rod 7. In the recess 26 as afforded by the clutch members 22 and 25 is located a clutch spring 36 that is anchored at one end as by a toe 37 extending into a pocket in the clutch member 25. The other end of said spring which is normally free from the clutch member 22 is formed to engage a rolling wedge 38 in the form of a ball that rides on the hub 21 of said clutch member. The parts just described are such that in response to relative movement of the clutch members in one direction the rolling wedge acts to expand the associated end of the spring so that it engages the annular wall of the recess and clutches said two members together for conjoint rotation. However, in response to relative movement or rotation of said members in the other direction the ball is inoperative so to expand the spring end with the result that one clutch member may overrun the other.

Fixed in the end walls 4 and 5 of the casing is a counter or jack shaft 39 on which is rotatively mounted a sleeve 40 having four gears 41, 42, 43 and 44 thereon. The gear 41 is in constant mesh with the gear 20 on the drive shaft 11 while the gear 42 is in constant mesh with the teeth 31 of the gear-like member 29.

On the splined part 19 of the shaft 12 is a gear 45 which is provided on its rear face with an annular groove 46. A yoke 47 is fixed to the shift rod 8 and fits in the groove 46. When the rod 8 is shifted forwardly the gear 45 is brought into mesh with the gear 43 to produce low speed forward and when the rod 8 is shifted rearwardly it is brought into mesh with a reverse gear (not shown) that is in constant mesh with the gear 44 before mentioned.

In the operation of the construction thus far described, and with the parts in the relative position shown in Figs. 1 and 2, it is apparent that with the shaft 11 being engine driven, the gear 20 will drive the jack shaft sleeve 40 through the gear 41 and this sleeve through the gear 42 will drive the gear member 29. With the shiftable collar 32 in the full line position shown in Fig. 2, it is apparent that as the splines 33 are in mesh only with splines 23 of the clutch member 22, no driving effect is imparted to said clutch member so that all parts are in neutral.

When the collar 32 is shifted forwardly (to the left as shown in dotted lines in Fig. 2) the splines 33 of said collar are in mesh both with the splines of the member 14 and with the splines 23 of the clutch member 22. Thus in the rotation of the member 14, the clutch member 22 is likewise rotated and this will cause the ball 38 to expand the endmost turn of the clutch spring 36 to cause said spring to clutch the two clutch members 22 and 25 together. Thus the shaft 11 tends to drive the shaft 12 at a one to one ratio through the clutch. Should the shaft 12 tend to rotate at a speed greater than that of the shaft 11, as when the automobile is descending a grade and said shaft 12 is being driven by the wheels of the automobile, the clutch member 25 will overrun the clutch member 22.

When it is desired to drive the shaft 12 at a differential in ratio with respect to the shaft 11 and with an overrunning action with respect thereto, the collar 32 is shifted rearwardly (to the right from the full line position in Fig. 2) only a part way of its entire movement as shown in Fig. 3. This will bring the splines 34 of said collar into mesh with the splines 30 of the gear-like member 29, the front end portion of the splines 33 of said collar still remaining in mesh with the splines 23 of the clutch member 22, the midportion of the collar bridging the splines 28 of the clutch member 25.

Thus the drive is through the gear 20 to the jack shaft sleeve 40 to the gear member 29. As the collar 32 is operatively engaged with both said gear and the clutch member 22, said clutch member is driven thereby. This will energize the clutch spring 36 to connect the clutch members 22 and 25 together so that the shaft 12 is driven from the shaft 11 through the clutch at a differential in ratio. Should the shaft 12 tend to rotate at a speed greater than that of the gear member 29, it merely overruns through the action of the clutch spring.

When the collar 32 is shifted rearwardly to the full limit of its movements, then the splines 34 thereof mesh with the rear end of the splines 30 of the gear member 29 and the splines 33 of said collar move out of mesh with the splines 23 of the clutch member 22 into engagement with the splines 28 of the clutch member 25 which as before described is splined to the shaft 12.

Thus the drive is through the gear 20 to the gear member 29 by way of the gears 41 and 42 and from said gear member 29 to the clutch member 25. Thus the shaft 12 is driven at a differential in ratio from the shaft 11 but not through the clutch spring so that in descending a grade in this speed, it is possible to employ the engine as a brake.

From the above, it is apparent that the structure just described permits of free wheeling in high or direct drive and it is optional whether or not free wheeling is desired at the differential in ratio driving connection between the shafts 11 and 12 which in this case is what is usually termed "second" speed or gear.

In Fig. 5 is shown a slightly modified form of construction wherein the collar 32ª (corresponding to the collar 32 before described) is provided only with the splines 33ª. In this arrangement the splines 28ª of the clutch member 25 are of the same diameter as that of the splines 23ª of the clutch member 22 and are shorter than the corresponding splines 28 as shown in Fig. 2. In this instance, the forward end of the gear 29 is made to overhang a part of the clutch member 25 and on said forward end of said gear are splines 30ª of a diameter corresponding to those of the splines on both clutch members 22 and 25.

With this arrangement, when the collar 32ª is shifted forwardly (or toward the left) from the full line neutral position, in Fig. 5 to the dotted line position shown in said figure, then the clutch member 14 drives the clutch member 22 through the medium of said collar. This clutch member 22 will through the spring 36 drive the clutch member 25 and should the shaft 12 tend to rotate faster than the shaft 11, the clutch member 25 will overrun the clutch member 22.

When the collar 32ª is moved rearwardly from the full line neutral position shown in Fig. 5 to the full line position shown in Fig. 6 wherein the splines 33ª of said collar are in mesh with not only the splines 23ª of the clutch member 22 but also with the splines 28ª of the clutch member 25 and with the splines 30ª of the gear member 29, then the drive is from the gear 29 to said gear member through the jack shaft sleeve gears 41—42.

As the collar 32ª is connecting the gear member 29 with both clutch members 22 and 25, it is apparent that the shaft 12 is being driven at a differential in ratio from the shaft 11 independent of the clutch so that no overrun is possible. Thus with the structure shown in Fig. 5 and Fig. 6 free wheeling action is possible in the direct drive or high speed gear between the shafts 11 and 12 and the free wheeling action is locked out or rendered inoperative in a differential in ratio drive between said shafts which in this instance is second speed gear.

In Fig. 7 and 8 is illustrated a further modified form of construction wherein free wheeling or overrunning is found in both direct drive (high speed gear) and in an intermediate speed (second speed gear) with no provisions for locking out or rendering inoperative the free wheeling or overrunning in either speed gear change.

As shown, this is accomplished by making the collar 32ᵇ axially shorter than heretofore and having only the splines 33ᵇ. In this instance, the clutch member 25 is devoid of splines and the forward end of the gear 29 overhangs not only the clutch member 25 but also the rear end portion of the clutch member 22. In this instance, the said forward end of the gear 29 is provided with teeth 30ᵇ of the same diameter as the splines 23 of the clutch member 22 which splines are shorter in length than those heretofore employed.

As shown in Fig. 7 the collar 32ᵇ is of a length approximating the length of the splines 23 of the clutch member 22. When this collar is shifted forwardly (to the left) from the neutral dotted line position into the full line position shown in Fig. 7, then the clutch member 22 is driven from the clutch member 14. This clutch member will then energize the spring 36 to clutch both clutch members together and should the shaft 12 rotate faster than the shaft 11, it will overrun the same through the clutch.

When the collar 32ᵇ is shifted rearwardly (to the right) from the dotted line neutral position shown in Fig. 7 to that position shown in Fig. 8, then the splines 33ᵇ of said collar are in mesh with the splines 23 and 30ᵇ of both the clutch member 22 and the gear member 29. Thus the drive is from the gear 20 to the gear member 29 through the gears 41 and 42 on the jack shaft sleeve and from the gear member 29 through the collar 32ᵇ to the clutch member 22 with a differential of ratio and from said clutch member through the spring 36 to the clutch member 25 to the shaft 12. Should the shaft 12 tend to rotate faster than the gear member 29, it will merely overrun the same through the clutch spring. Thus free wheeling is had in both driving ratios described with no provisions for locking out or rendering inoperative, the free wheeling in either ratio.

The constructions described readily permit of different driving combinations between the driving and driven shafts with but minor changes in the form and arrangement of the associated elements. In each instance, however, it is only necessary to impart shifting movement to a collar to have free wheeling when desired, instead of shifting the entire unit as is necessary in certain transmissions now made for the same purpose.

The parts are simple and practical to produce, so that manufacturing and assembly costs are reduced to a minimum and said parts operate efficiently for their intended purpose.

While in describing the invention, I have referred in detail to the form, arrangement and construction of the associated parts, the same is to be considered merely as by way of illustration so that I do not wish to be limited thereto except as may be specifically set forth in the appended claims.

I claim as my invention:—

1. A transmission embodying therein a driving shaft having fixedly secured thereto an annular clutch member with splines on the outer periphery thereof, and also having secured thereto a gear of smaller diameter than the clutch member and positioned adjacent to the latter, a driven shaft coaxially positioned with respect to the driving shaft, a jack shaft element having a gear in mesh with and constantly driven by the gear on the driving shaft, and also having a second gear, an overruning clutch including two, complemental, externally splined, cup-like members and a clutch spring between the members, one of said cup-like members being fixed on the driven shaft and the other being loose on the driven shaft, a gear member mounted loosely about the driven shaft and adjacent to the fixed cup-like member and in mesh with and constantly driven by the second gear on the jack shaft element, and an internally splined collar normally surrounding the loose cup-like member and in mesh with the external splines of the latter and shiftable to connect said loose cup-like member to either the clutch member on the driving shaft or to the gear on the driven shaft.

2. A transmission embodying therein a driving shaft having fixed thereon a spline type clutch member and a gear, a coaxial driven shaft, a jack shaft element having a gear in mesh with and constantly driven by the gear on the driving shaft and also having a second gear, an overrunning clutch including two complemental, externally splined, cup-like members, and a helical clutch spring of the expanding type between the two members, one of said members being fixed on the driven shaft and provided with an elongated hub and the other being mounted loosely on such shaft, a gear loosely mounted on the hub of the fixed member and in mesh with and constantly driven by said second gear on the jack shaft element, and an internally splined collar normally surrounding the loose cup-like member and in mesh with the external splines thereof and shiftable axially in one direction into mesh with the spline type clutch member on the driving shaft so as to connect said loose member for drive thereby and in the opposite direction into mesh with the constantly driven gear on the hub of said fixed cup-like member so as to connect said loose member for drive by said last mentioned gear.

CLARENCE H. BARTON.